US012779367B2

(12) United States Patent
Rotter et al.

(10) Patent No.: US 12,779,367 B2
(45) Date of Patent: Nov. 3, 2026

(54) FILTER UNIT AND BASE UNIT OF AN OIL-WATER-SEPARATING DEVICE FOR REMOVING OIL-CONTAINING CONSTITUENTS FROM AN OIL-WATER MIXTURE

(71) Applicant: BEKO TECHNOLOGIES GMBH, Neuss (DE)

(72) Inventors: Karsten Rotter, Korschenbroich (DE); Marcel Runde, Cologne (DE); Johannes Sinstedten, Korschenbroich (DE); Sascha Weidenhausen, Neuss (DE); Henning Tillmanns, Nordwalde (DE)

(73) Assignee: BEKO TECHNOLOGIES GMBH, Neuss (DE)

( * ) Notice: Subject to any disclaimer, the term of this patent is extended or adjusted under 35 U.S.C. 154(b) by 521 days.

(21) Appl. No.: 18/256,794

(22) PCT Filed: Dec. 9, 2021

(86) PCT No.: PCT/EP2021/085029
§ 371 (c)(1),
(2) Date: Jun. 9, 2023

(87) PCT Pub. No.: WO2022/122940
PCT Pub. Date: Jun. 16, 2022

(65) Prior Publication Data

US 2024/0042349 A1 Feb. 8, 2024

(30) Foreign Application Priority Data

Dec. 11, 2020 (DE) ..................... 10 2020 133 106.1

(51) Int. Cl.
*B01D 17/02* (2006.01)
*B01D 27/08* (2006.01)
(Continued)

(52) U.S. Cl.
CPC ......... *B01D 17/0202* (2013.01); *B01D 27/08* (2013.01); *B01D 27/108* (2013.01);
(Continued)

(58) Field of Classification Search
CPC .... B01D 17/0202; B01D 17/10; B01D 27/08; B01D 27/108; B01D 29/52; B01D 35/303; C02F 9/20
See application file for complete search history.

(56) References Cited

U.S. PATENT DOCUMENTS 5,194,149 A * 3/1993 Selbie ................. B01D 63/046 210/232
5,651,887 A 7/1997 Posner et al.
(Continued)

FOREIGN PATENT DOCUMENTS

DE 102006009542 A1 9/2006
DE 60125914 T2 2/2007
(Continued)

OTHER PUBLICATIONS

International Search Report for International Application No. PCT/EP2021/085029, dated Mar. 11, 2022, 2 pages.
(Continued)

*Primary Examiner* — Liam Royce
(74) *Attorney, Agent, or Firm* — CANTOR COLBURN LLP

(57) ABSTRACT

A filter unit for integration in an oil-water-separating device for removing oil-containing constituents from an oil-water mixture includes a housing which separates a filter interior from an environment, there being in the filter interior filter material for at least partially removing oil from the oil-water mixture. An inflow opening is provided, and the housing has, downstream of the filter material, an outflow opening for providing an outflow of cleaned liquid from the filter inte-
(Continued)

rior. The filter unit is a filter cartridge for detachable connection to and disconnection from the oil-water-separating device. Moreover, the outflow opening of the housing is closable by an automatic filter cartridge closure that is moveable from a closed to an open state. A base unit of an oil-water-separating device for removing oil-containing constituents from an oil-water mixture, and an oil-water-separating device for removing oil-containing constituents from an oil-water mixture are also related.

20 Claims, 7 Drawing Sheets

(51) Int. Cl.

*B01D 27/10* (2006.01)
*B01D 29/52* (2006.01)
*B01D 35/30* (2006.01)
*C02F 9/20* (2023.01)

(52) U.S. Cl.

CPC ........... *B01D 29/52* (2013.01); *B01D 35/303* (2013.01); *C02F 9/20* (2023.01)

(56) References Cited

U.S. PATENT DOCUMENTS

| | | | |
|---|---|---|---|
| 2001/0045386 | A1 | 11/2001 | Stankowski et al. |
| 2005/0035042 | A1 | 2/2005 | Rowe et al. |
| 2009/0173675 | A1 | 7/2009 | Scholz et al. |

FOREIGN PATENT DOCUMENTS

| | | | |
|---|---|---|---|
| DE | 202008004291 | U1 | 8/2009 |
| DE | 102015112092 | A1 | 1/2017 |
| DE | 102017106848 | A1 | 7/2018 |
| KR | 20020075452 | A | 10/2002 |
| KR | 200384558 | Y1 | 5/2005 |
| KR | 101184882 | B1 | 9/2012 |
| KR | 20130058735 | A | 6/2013 |

OTHER PUBLICATIONS

Written Opinion for International Application No. PCT/EP2021/085029, dated Mar. 11, 2022, 3 pages.

* cited by examiner

Prior art a)

FILTER UNIT AND BASE UNIT OF AN OIL-WATER-SEPARATING DEVICE FOR REMOVING OIL-CONTAINING CONSTITUENTS FROM AN OIL-WATER MIXTURE

CROSS-REFERENCE TO RELATED APPLICATIONS

This application is a 35 U.S.C. § 371 National Stage patent application of PCT/EP2021/085029 filed 9 Dec. 2021, which claims the benefit of German patent application 10 2020 133 106.1 filed 11 Dec. 2020, the disclosures of which are incorporated herein by reference in their entirety.

TECHNICAL FIELD

The disclosure concerns a filter unit for integration into an oil-water-separating device for removing oil-containing components from an oil-water mixture with the features of the generic term stated in a claim. Furthermore, the disclosure relates to a base unit of an oil-water-separating device having the features of the generic term of another claims and an oil-water-separating device having the features of the generic term of a further claim.

One field of application for which the present disclosure is also provided, in particular, is the cleaning of condensate from compressed-air processes. Accordingly, the present disclosure relates, in particular, to a filter unit for integration into an oil-water-separating device for removing oil-containing components from an oil-water mixture in the form of condensate from a compressed-air process. Such oil-water-separating devices (or also called oil-water-separating devices) can also be referred to as condensate separators.

BACKGROUND

Oil-water-separating devices are often used in conjunction with air compressors, since when compressed air is generated, the humidity contained in the ambient air is physically caused by the suction and compression of ambient air and by drying the compressed air as condensate. As an oil-water mixture, this condensate is wastewater that is not allowed to be discharged into the public sewer, among other things, because of the entry of the air compressor's lubricants due to being contaminated with oil and dirt particles and, for example, exceeding the limit values for hydrocarbon concentration. The contaminating oil can come from the lubrication of the compressor or be sucked in from the environment as oil vapour. Dirt particles can originate, for example, from abrasion of the compressor or also from the environment (e.g., in the form of pollen).

At a volumetric flow of 60 $m^3/h$ of sucked-in air, a mostly discontinuous condensate flow of 1.23 L/h can typically occur, which is loaded with 240 mg/h of oil. This corresponds to 195 mg of oil per litre of condensate. Depending on various parameters, these values may fluctuate, wherein these parameters can include, for example, climatic conditions (ambient temperature and humidity), the type of oil used in the compressor and the design and operation of the compressor. The bond between water and lubricant is also varied and ranges from a mixture of oil and water to a dispersion and an emulsion. However, permissible values for outflow into the sewer are at the magnitude of 10-20 mg/L, in some cases, in part, even 5 mg/L (oil/condensate). This results in hazardous waste to be disposed of by waste disposal companies, although more than 99.5% of it is water from the humidity of the ambient air.

The condensate must therefore always be disposed of properly, wherein the residual oil content in this oil-water mixture must be reduced to the regulated limit values, country-specific ones in particular. The oil-water mixture is to be converted as a liquid to be purified into a purified liquid in the form of wastewater that can be discharged into the sewer system. Therefore, the oil must be removed from the water to a great extent.

For this purpose, it is known to use oil-water-separating devices for the treatment of such condensate, which can remove the oil components from the liquid to be cleaned in a low-cost manner. Well-known apparatuses of this type regularly operate with a plurality of separation stages in order to achieve the desired purity of the water. Typically, the condensate is slowly introduced into a pre-separator, thereby with a level of low turbulence via a pressure-relief element. This works according to the principle of gravity separation and ensures the settling of heavy, sediment-like impurities (density greater than 1 $kg/dm^3$) and the floating of free oil particles (density less than 1 $kg/dm^3$); these oil particles then flow to a collection container. At a second stage, a filter, for example, an adsorption filter with adsorption filter material separates mainly fine oil droplets from the condensate, wherein the filter material is often based on an oleophilic material, as well as activated carbon with a very large inner surface. The adsorption filter material is thus set up for the adsorption of dispersed oil.

From DE 10 2006 009 542 A1, for example, an oil-water-separating device is basically known, in which the liquid to be cleaned in the form of condensate together with the free oil particles is passed through an adsorption filter with adsorption filter material. The design of this oil-water-separating device works on the principle of communicating tubes, wherein, to the extent that new condensate flows, treated condensate leaves the apparatus at the pure-water outflow towards the sewer.

In addition, further oil-water-separating devices are known from DE 10 2015 112 092 A1 and from DE 10 2017 106 848 A1, wherein the oil-water-separating device according to DE 10 2015 112 092 A1 is operated in combination with pressurization by compressed air and the oil-water-separating device according to DE 10 2017 106 848 A1 in combination with static pressurization.

In FIG. 1, a basic oil-water-separating device 1 is schematically depicted in accordance with prior art. The oil-water-separating device 1 is designed to remove oil-containing components from an oil-water mixture. The liquid L to be cleaned in the form of the oil-water mixture initially enters the oil-water-separating device 1 by being introduced through an inflow opening 2 on the top or head side. The liquid L to be cleaned is then passed on via an inflow channel 3 and finally fed to a filter unit 4. During this process, the liquid L to be cleaned is fed into a filter interior 5, which is separated from the environment U by means of a housing 6. The liquid L to be cleaned specifically flows via the inflow opening 7 into the filter interior 5, where it meets filter material, in this case, adsorption filter material 8 for the adsorption of dispersed oil. On the underside or on the bottom side, the oil-water-separating device 1 comprises a collection space or a manifold 9 which absorbs and collects the purified liquid W (dashed arrow) downstream of the adsorption filter material 8. From the manifold 9, the purified liquid W passes on to a riser 26, from which the liquid W purified by the oil-containing constituents can finally be discharged via an outflow 28, and thus, for example, fed into the sewer system as dischargeable water. The oil-water-separating device 1 shown operates according to the hydrostatic principle of communicating tubes.

SUMMARY

The present disclosure is not limited to the hydrostatic principle. Rather, the findings of the present disclosure can be used flexibly in that the proposed filter unit and the proposed oil-water-separating device can be integrated into systems in which the proposed filter unit is directly connected to a condensate line, for example, without pressure relief. Furthermore, it can also be used in combination with pressurization, for example, via compressed air. Furthermore, the disclosure can of course also be used in the case of the disclosure shown in FIG. 1 in the case of static pressurization. Other applications are also conceivable, such as operation with a pressure-relief chamber as well for example.

Prior art is in need of improvement to the extent that the performance of the filter systems should also be maintained over a longer operating period of the overall system despite the occurrence of contamination or increasing saturation of the filter material. In principle, the flow resistance of the filter units in condensate separators can increase due to contamination and saturation during operation. The increase in flow resistance may occur even before the absorption capacity of the filter material for oil has been exhausted. For this reason, the filter unit must be exchanged regularly. Such a filter change is very time-consuming with the known systems. For example, the problem arises that filter units have to be removed from the actually closed collection space. The condensate to be cleaned in the collection space in front of the filter interior often has to be collected and removed separately on a regular basis. In addition, the collection space itself must be cleaned at great expense in order to avoid, for example, a rapid filling of newly inserted filter units with particles and so-called fouling substances. Even if a filter system is designed to be more simply replaceable, the problem can arise that the entire system has to be stopped, i.e., the filtration process has to be stopped in the meantime in order to replace the filter units.

Furthermore, the intervention in the closed pipe system of the oil-water-separating device is usually accompanied by an increased risk of contamination. For example, when changing the filter, residual amounts of condensate or contamination often escape from the outflow openings of the filter units and contaminate the entire system. The connected pipes or hoses and especially the connection points are also difficult to clean.

Finally, another problem is that the performance or capacity of the known systems cannot be adapted to the given conditions, such as the amount of condensate or the degree of contamination of the liquid to be cleaned in the case of a variable amount of condensate.

Based on this, the disclosure therefore further develops and improves the known filter unit in such a way that a simple and clean filter exchange is possible. Furthermore, the disclosure provides an oil-water-separating device as well as a base unit for an oil-water-separating device, in which a simple and clean filter change can be ensured. In particular, it should be possible to react as flexibly as possible, on the one hand, to the contamination of a filter unit, and on the other hand, also to a varying utilization of the entire system, for example by varying the amount of condensate or contamination of the condensate supplied.

This problem is solved with respect to a filter unit having the features of the generic term of the first independent claim by the features of the characterizing part of the claim. Furthermore, the problem with regard to a base unit is solved by the base unit having the features of another claim, and with regard to an oil-water-separating device having the features of another claim.

It should be noted that the features listed individually in the claims can be combined with each other in any technically reasonable way, even beyond the boundaries of the ancillary independent claims, and show further embodiments of the disclosure. The description characterizes and specifies the disclosure, in particular, additionally in conjunction with the figures.

It is essential to the disclosure to realize that replaceable and easy-to-use filter cartridges are provided, which interact with a base unit of an oil-water-separating device in a simple way and, above all, can be installed and disassembled without special additional handling. The system comprises a base unit with filter receptacles for the filter cartridges and filter cartridges themselves can be favourably coordinated with one another. For example, the proposed filter units are characterized by the fact that the outflow openings can be opened completely automatically via the respective automatic filter cartridge closure, meaning, in particular, without the need for special handling. In concrete terms, it is preferable to insert a filter cartridge into a corresponding filter receptacle of a base unit to ensure that the automatic filter cartridge closure changes from its closed state to the open state without the need for the user to actively open the filter cartridge closure for example. The proposed base unit, in turn, is favourably designed with the filter receptacle for filter units to be connected, wherein this filter receptacle represents precisely the connection point between the filter unit intended upstream and the manifold connecting to these filter units for collecting or conveying the purified liquid forward. Ultimately, the interface is the inflow opening into the base unit, which can be opened completely automatically via the automatic collector closure, meaning, in particular, without the need for special handling. In concrete terms, it is preferable to insert a corresponding filter unit into the filter receptacle of the proposed base unit to ensure that the automatic collector closure changes from its closed state to the open state without the need for the user to actively open the collector closure for example.

The proposed filter unit is designed for integration into an oil-water-separating device for removing oil-containing components from an oil-water mixture, as well as for re-disassembly from this oil-water-separating device. The proposed filter unit has a housing that separates a filter interior from an environment. In the filter interior, filter material is arranged for at least partial removal of oil from the oil-water mixture. Preferably, this is adsorption filter material for adsorption of dispersed oil. Furthermore, an inflow opening is provided for providing an inflow of liquid to be cleaned, for example, condensate from a compressed-air process, into the filter interior. Finally, the housing downstream of the filter material comprises a outflow opening for providing an outflow of purified liquid, such as the cleaned condensate that has essentially been freed from oil as intended from the filter interior.

According to the proposal, the filter unit is designed as a filter cartridge for a detachable connection to and for the re-disassembly from the oil-water-separating device. Furthermore, it is proposed that the outflow opening of the housing is designed to be closable by means of an automatic filter cartridge closure, wherein the automatic filter cartridge closure is designed to be moveable from a closed state to prevent the outflow of purified liquid from the filter interior to an open state to allow the outflow of purified liquid from the filter interior.

In principle, the automatic filter cartridge closure can take both the closed as well as the open state. Preferably, thereby, the filter cartridge can be opened and closed several times without having to make any changes or additions to the filter cartridge. Preferably, the inflow opening is assigned to a top side and the outflow opening of a bottom side of the filter cartridge. Further, the top side is essentially directed vertically upwards during operation and the bottom side essentially directed vertically downwards during operation. With regard to the automatic filter cartridge closure, automatic is to be understood in the present case to mean that no particular actions are necessary, for example, on the part of the user, to open the automatic filter cartridge closure, or preferably also not in order not to close the filter cartridge closure again. A major advantage of the proposed filter unit is that the replacement of filter cartridges to be replaced, for example, due to an excessive load on the adsorption filter material, can occur in a simple and, above all, clean manner. For example, when disassembling a filter unit from an oil-water-separating device, the automatic filter cartridge closure can preferably ensure that the outflow opening of the filter unit, which actually releases the outflow to the outside, is automatically closed. It is therefore favourable that the change can be drip-free, i.e., essentially without condensate escaping from the outflow opening. In an favourable way, only the respective filter cartridge has to be replaced and no longer the entire collector. In this way, resources can be conserved. The filter cartridges can be particularly favourable in terms of size and weight in such a way that they can be easily carried and replaced by a user, for example, by a service person, without any aids. This makes the service easier. The proposed filter unit is a replaceable filter cartridge, preferably by hand.

According to the further aspect of the present disclosure, a base unit of an oil-water-separating device for removing oil-containing components from an oil-water mixture, in particular, from condensate from a compressed-air process, is proposed, wherein the proposed base unit comprises at least one inflow opening on the input side for the introduction of liquid cleaned in an upstream filter unit, i.e., already cleaned of oil and dirt particles within specified limits. Furthermore, a manifold is provided for the transfer of the purified liquid. The inflow opening provides access for the purified liquid into the manifold. Ultimately, a riser is also provided, which is in fluid connection with the manifold and is set up to discharge the purified liquid via an outflow opening provided downstream, for example, into the sewer system.

According to the proposal, at least one filter receptacle is provided for the base unit. The filter receptacle is set up for the detachable connection and re-disassembly of the upstream filter unit in the form of a filter cartridge, preferably a filter unit according to the proposal. According to the proposal, the inflow opening is located in the area of the filter receptacle and is closable by means of an automatic collector closure that separates the manifold from an environment. The automatic collector closure is proposed to be designed to be moveable from a closed state to close a fluid connection between the manifold and the environment to an open state to allow the liquid purified in the upstream filter unit to be introduced.

In principle, the automatic collector closure can assume both the closed as well as the open state. Preferably, the corresponding inflow opening of the base unit can thus be opened and closed several times without having to make any changes or additions to the base unit. Preferably, the inflow opening is assigned to a top side of the base unit and the top side is further preferably directed vertically upwards during operation. Opposite the top side and thus also from the filter connection, the bottom side of the base unit is preferably provided, on which bottom side, in particular, the base unit is also in operation. With regard to the automatic collector closure, automatic means that no action is necessary on the part of the user, for example, to open the automatic collector closure, or preferably also not in order to close the collector closure again. A major advantage of the proposed base unit is that a change of connected filter cartridges, for example, due to excessive loading of the filter material, can be carried out in a simple and, above all, clean manner. For example, when disassembling a connected filter unit, the automatic collector closure can preferably ensure that the inflow opening of the base unit, which is actually a connection to the outside, is automatically closed. It is therefore favourable to disassemble a filter cartridge without making the base unit dirty and, in particular, without escaping condensate already in the manifold. Each inflow opening of the base unit is preferably set up in such a way that it is automatically closed by the respective automatic collector closure if no filter cartridge is inserted in the corresponding filter receptacle. In an favourable way, only the respective filter cartridge needs to be replaced and no longer the entire collector or the base unit. In this way, resources can be conserved.

In the case of the preferred use of the proposed base unit with proposed filter cartridges, the respective filter cartridge closures and collector closures can form corresponding closures. One or a plurality of filter cartridges can be placed in the corresponding filter receptacle of the base unit.

According to the further aspect of the present disclosure, an oil-water-separating device for removing oil-containing components from an oil-water mixture, for example, from a condensate originating from a compressed-air process, is proposed. The proposed oil-water-separating device shall have a proposed base unit. Preferably, a proposed filter unit in the form of a filter cartridge is also provided. Further, preferably, the filter cartridge corresponds to the filter receptacle in such a way that when the filter cartridge is held in the filter receptacle, the automatic filter cartridge closure and the automatic collector closure collide in such a way that both the automatic filter cartridge closure as well as the automatic collector closure are each moved to the open state.

A preferred embodiment of the filter unit is characterized in that the automatic filter cartridge closure is arranged in such a way that an opening force directed to an outer side of the automatic filter cartridge closure facing the environment moves the automatic filter cartridge closure from the closed state to the open state. In this way, it is particularly easy to couple the filter cartridge with an oil-water-separating device with a simultaneous automatic opening of the outflow from the filter cartridge. In particular, the outer side of the automatic filter cartridge closure is assigned to the bottom side of the filter cartridge. The opening force is directed, in particular, in the direction of the filter interior. Preferably, an arbitrarily small force is not sufficient as an opening force, but the opening force must be a specified minimum force.

A further preferred embodiment of the filter unit is characterized in that a filter-cartridge contact surface is provided to the system against a downstream component of the oil-water-separating device during operation of the oil-water-separating device. As a result, the filter-cartridge contact surface can be used, for example, to open an inflow opening in a downstream base unit of an oil-water-separating device as intended. In this way, it is favourable to automatically enable the inflow into a downstream connecting manifold. Preferably, it can be provided that the filter-cartridge contact surface is set back with relation to a bottom-side plane of the filter cartridge. As a result, the filter-cartridge contact surface is set back as a functional surface with relation to the outermost bottom side of the housing in such a way that the filter-cartridge contact surface is better protected against an unwanted stop from the outside. Furthermore, preferably, it may be provided that an opening plane defined by the outflow opening is set back with relation the filter-cartridge contact surface so that the filter-cartridge contact surface is generally easy to reach, for example for the intended stop to downstream components of the oil-water-separating device, such as the inflow into a manifold of a base unit.

A further preferred embodiment of the filter unit is characterized in that the filter-cartridge contact surface is formed on an outer side of the automatic filter cartridge closure facing the environment. As a result, particularly effective functions can be connected to each other or implemented simultaneously. This is because, as described, the filter-cartridge contact surface can be favourably used to operate downstream components of the oil-water-separating device, for example to open a downstream manifold of a base unit. Simultaneously, however, the operation, meaning the opening of the filter cartridge closure can also be carried out in an favourable way if the intended stop is made against the filter-cartridge contact surface.

A further preferred embodiment of the filter unit is characterized in that the automatic filter cartridge closure is designed to be changeable between the open state to allow the outflow of purified liquid from the filter interior and the closed state to prevent the outflow of purified liquid from the filter interior. This enables a particularly effective and clean filter change. In this way, the disassembly of the filter cartridge from the oil-water-separating device can favourably ensure that the filter cartridge closure, which was in the open state before disassembly, changes to its closed state without the need for active closing by the user.

A further preferred embodiment of the filter unit is characterized in that the automatic filter cartridge closure is arranged in such a way that a closing force directed onto an inner side of the automatic filter cartridge closure facing the filter interior moves the automatic filter cartridge closure from the open state to the closed state. In this way, the interaction of the filter cartridge and the oil-water-separating device is implemented in a particularly easy manner so that, when a filter cartridge is disassembled, the outflow from the filter cartridge is automatically closed simultaneously, thus successfully preventing condensate from escaping. In particular, the inner side of the automatic filter cartridge closure points in the direction of the filter interior and basically in the direction of the top side of the filter cartridge. The closing force is directed in particular in the direction of the filter interior.

A further preferred embodiment of the filter unit is characterized in that a spring is subsequently arranged to the inner side of the automatic filter cartridge closure and at least partially exerts closing force onto the inner side of the automatic filter cartridge closure. As a result, the automatic filter cartridge closure can be held particularly securely in its closed state or moved back into it. In addition, or as an alternative, the liquid to be cleaned or already cleaned in the filter interior (downstream of the filter material) preferably at least partially exerts closing force onto the inner side of the automatic filter cartridge closure. Preferably, an arbitrarily small force is not sufficient as a clamping force, but the clamping force must be a specified minimum force.

A further preferred embodiment of the filter unit is characterized in that, in the open state of the automatic filter cartridge closure, a flow channel is formed between an outer side of the automatic filter cartridge closure facing the environment and the housing in the area of the outflow opening, wherein the flow channel provides a fluid connection from the filter interior to the outside. Specifically, preferably in the mounted state of a filter cartridge, it is intended that the flow channel provides the fluid connection to the manifold of the connected oil-water-separating device or base unit of the oil-water-separating device. In particular, the outer side of the automatic filter cartridge closure is assigned to the bottom side of the filter cartridge. Basically, outwardly this means from the area of the filter cartridge and not in the assembled state, i.e., when a filter cartridge is inserted into a filter receptacle of a base unit, from the entire oil-water-separating device.

A further preferred embodiment of the filter unit is characterized in that the outflow opening and, in particular, the flow channel formed in the open state of the automatic filter cartridge closure is closed in the closed state of the automatic filter cartridge closure in such a way that, in an outdoor area, an outer side of the automatic filter cartridge closure facing the environment has an operative connection with an inner surface of the housing facing the filter interior in sealing manner. In this way, a secure closure of the filter cartridge is favourably ensured. In particular, the outer side of the automatic filter cartridge closure is assigned to the bottom side of the filter cartridge.

A further preferred embodiment of the filter unit is characterized in that the inflow opening is assigned to a top side of the filter cartridge and the outflow opening is assigned to a bottom side of the filter cartridge, and that an inflow channel is provided, wherein the inflow channel is arranged above the inflow opening and has a fluid connection with the inflow opening, and wherein, furthermore, the inflow channel is a junction for conveying a part of the liquid to be cleaned forward into an adjacent filter cartridge. In this way, a filter cartridge that is as flexible as possible is provided. In this way, the filter cartridge can be connected together with other adjacent filter cartridges and the performance of the entire filter system can be favourably adjusted in a simple way. If, for example, a plurality of filter cartridges is connected in parallel, then a part of the liquid to be cleaned can be fed to one filter cartridge at a time. Preferably, being connected in parallel, the plurality of filter cartridges can then ensure that a filter cartridge to be replaced can be easily disassembled from the entire system without having to stop the entire system and thus the filter process. This eliminates the need for time-consuming collection of condensate in an upstream collection space. In any case, a flexible overall system is provided in which the performance of the oil-water-separating device can be individually adjusted by adding or removing individual filter cartridges.

Being furthermore preferred, the inflow channel can comprise an inflow opening for the initial entry of the liquid to be purified into the filter cartridge and a junction opening for conveying a part of the liquid to be purified out of the filter cartridge forward into an adjacent filter cartridge, wherein the junction opening is designed to be changeable between an open state and a closed state. Preferably, it is also intended that the junction opening is designed for a fluid-tight connection to an inflow opening of an adjacent filter cartridge. Preferably, an automatic inflow closure, which can close or open the inflow opening, and/or an automatic junction closure, which can close or open the junction opening, can also be provided so that the inflow opening or the junction opening can also be favourably moved to an open state and, if necessary, also automatically returned to a closed state. In this case, the closures can also be automatically moved to the respective intended states open or closed in the manner described in connection with the automatic filter cartridge closure. Preferably, springs can also be provided, which basically put the respective closure in the closed state. In this way, it is favourable to ensure that when a filter cartridge is removed, almost no liquid escapes unwanted, even from the inflow channel.

A further preferred embodiment of the filter unit is characterized in that the outflow opening is assigned to a bottom side of the filter cartridge and an opening plane is defined by the outflow opening, and that the housing at the bottom side comprises at least one projection, preferably designed as a circumferential edge with relation to the opening plane of the outflow opening for positioning the filter cartridge in a filter receptacle corresponding to the projection of the oil-water-separating device. In this way, the installation of the filter cartridges can be particularly simplified. In this way, the projection can serve as a guide and support for assembly. It makes it easy to intervene in the intended cartridge location, i.e., in the corresponding filter receptacle of a base unit. In particular, the projection is directed away from the filter interior. For example, lateral supports can serve as a projection. The outflow opening is preferably set back by forming the projection with relation to the lowest end of the bottom side of the filter cartridge. Particularly favourable, the filter cartridges can be easily inserted into the intended position in the oil-water-separating device by a user, for example by a service person, without any aids.

A preferred embodiment of the base unit is characterized in that at least two filter receptacles are provided for detachable connection and re-disassembly of at least two filter cartridges. Each filter receptacle can comprise its own inflow opening described previously, but the base unit preferably only comprises one common manifold and one common riser. Any number of filter receptacles can also be provided for a plurality of filter cartridges.

A further preferred embodiment of the base unit is characterized in that the automatic collector closure is arranged in such a way that an opening force directed onto an outer side of the automatic collector closure facing the environment moves the automatic collector closure from the closed state to the open state. In this way, it is particularly easy to couple a filter cartridge to be installed with the base unit with simultaneous automatic opening of the inflow of the cleaned liquid into the manifold of the base unit. In particular, the outer side of the automatic collector closure is assigned to the top side of the base unit. The opening force is directed in particular in the direction of the manifold. Preferably, an arbitrarily small force is not sufficient as an opening force, but the opening force must be a specified minimum force.

Preferably, the automatic collector closure is set up in such a way that a clamping force directed to an inner side of the automatic collector closure facing the manifold, and in particular in the direction of the environment, moves the automatic collector closure from the open state to the closed state. In this way, the interaction of the upstream filter cartridge and the base unit of the oil-water-separating device is implemented in a particularly easy manner so that, if a filter cartridge is disassembled, access to the manifold of the base unit is automatically closed simultaneously, thus successfully preventing condensate from escaping. In particular, the inner side of the automatic collector closure points in the direction of the manifold, preferably in the direction of the bottom side of the base unit. The clamping force is directed in particular in the direction away from the manifold and in the direction of the top side of the base unit.

A further preferred embodiment of the base unit is characterized in that a spring is adjacent to the inner side of the automatic collector closure and at least partially exerts the clamping force onto the inner side of the automatic collector closure. As a result, the automatic collector's shutter can be held particularly securely in its closed state or moved back into it. In addition, or as an alternative, the purified liquid in the manifold preferably at least partially exerts the clamping force onto the inner side of the automatic collector closure. In particular, the riser downstream of the manifold thus favourably supports an automatic and fast closing of the inflow openings of the base unit by means of the automatic collector closures over the existing liquid column. Preferably, an arbitrarily small force is not sufficient as a clamping force, but the clamping force must be a specified minimum force.

A further preferred embodiment of the base unit is characterized in that, in the open state of the automatic collector closure, a flow channel is formed between an outer side of the automatic collector closure facing the environment and the base unit in the region of the inflow opening, which flow channel provides a fluid connection from the outside into the manifold. In particular, in the mounted state of a filter cartridge in the filter receptacle of the base unit, it is provided that the flow channel provides the fluid connection from the connected filter cartridge and there the filter interior to the manifold of the base unit of the oil-water-separating device. In particular, the outer side of the automatic collector closure is assigned to the top side of the base unit, and further preferably facing the bottom side of the filter cartridge when mounted in the mounted state of a filter cartridge.

Further, preferably, it is provided that, in an outdoor area, an outer side of the automatic collector closure facing the environment has an operative connection with an inner surface of a top side of the base unit facing the manifold in a sealing manner. In this way, a secure closure of the base unit is favourably ensured. In particular, the outer side of the automatic collector closure is assigned to the top side of the base unit.

A further preferred embodiment of the base unit is characterized in that the inflow opening is assigned to a top side of the base unit, and an opening plane is defined by the inflow opening, and that the top side comprises at least one recess, preferably being circumferential, wherein the recess is set back with relation to the opening plane of the inflow opening to hold a filter cartridge with at least one projection corresponding to the recess.

In this way, the installation of corresponding filter cartridges in the filter receptacles of the base unit can be particularly simplified. Thus, the recess can serve as a guide and support for assembly. It is possible to easily intervene in the intended cartridge location, i.e., in the corresponding filter receptacle of the base unit. In particular, the recess is directed in the direction of the manifold. Particularly favourable, the filter cartridges can be easily inserted into the intended position in the base unit of the oil-water-separating device by a user, for example by a service person, without any aids. For this purpose, it is preferable to simply insert the projection or projections of a filter cartridge into the corresponding recess of the filter receptacle of the base unit.

A further preferred embodiment of the base unit is characterized in that the automatic collector closure is designed to be interchangeable between the open state for allowing the outflow of the liquid purified in the upstream filter unit and the closed state for closing a fluid connection between the manifold and the environment. As a result, even the disassembly of the filter unit from the proposed base unit of the oil-water-separating device can be particularly effective in ensuring that the collector closure, which was in the open state before disassembly, changes to its closed state without the need for the user to actively close it.

A preferred embodiment of the oil-water-separating device is characterized in that a plurality of the filter cartridges is provided, wherein the plurality of the filter cartridges is connected in parallel and the filter cartridges with their outflow openings each flow into the manifold as a common manifold and this common manifold in turn flows into the riser as a common riser of the oil-water-separating device.

According to a further aspect of the present disclosure, which is independent of the advantages described above, a method for changing a filter unit of an oil-water-separating device for removing oil-containing components from an oil-water mixture is proposed. In this case, a filter unit in the form of a filter cartridge is used for detachable connection to and disassembly again from the oil-water-separating device to a filter receptacle of a base unit of the oil-water-separating device, wherein this insertion moves an automatic filter cartridge closure, which closes a outflow opening of the filter cartridge in a closed state, from its closed state to its open state.

Preferably, the method also provides that disassembly of a filter cartridge inserted into the filter receptacle results in the automatic filter cartridge closure being automatically moved from its open state to its closed state. Likewise, the method also preferably provides for a disassembly of a filter cartridge inserted in the filter receptacle resulting in that an automatic collector closure, which is set up with a closable inflow opening of the base unit, wherein the inflow opening provides a fluid connection from the filter cartridge via the outflow opening of the filter cartridge into a manifold of the base unit, is automatically moved from its open state to its closed state.

BRIEF DESCRIPTION OF THE DRAWINGS

Further favourable and preferred embodiments result from the following description with reference to the figures. In the drawing, which only renders an exemplary embodiment, the figures show.

DETAILED DESCRIPTION OF THE DRAWINGS

Figure 1:
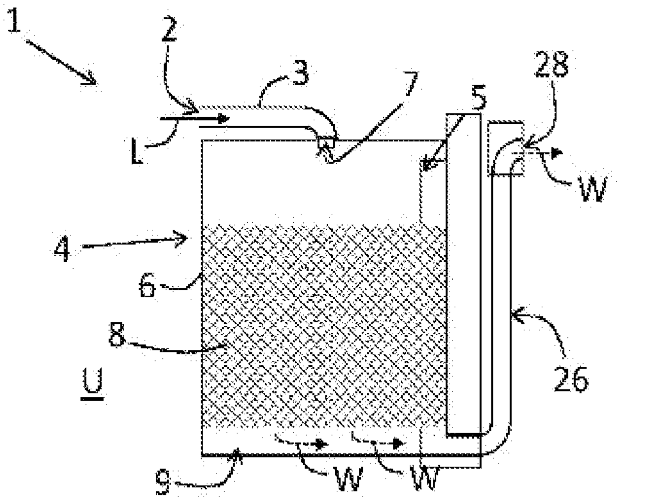
FIG. 1*a* schematic illustration of a oil-water-separating device according to prior art.
Figure 2:
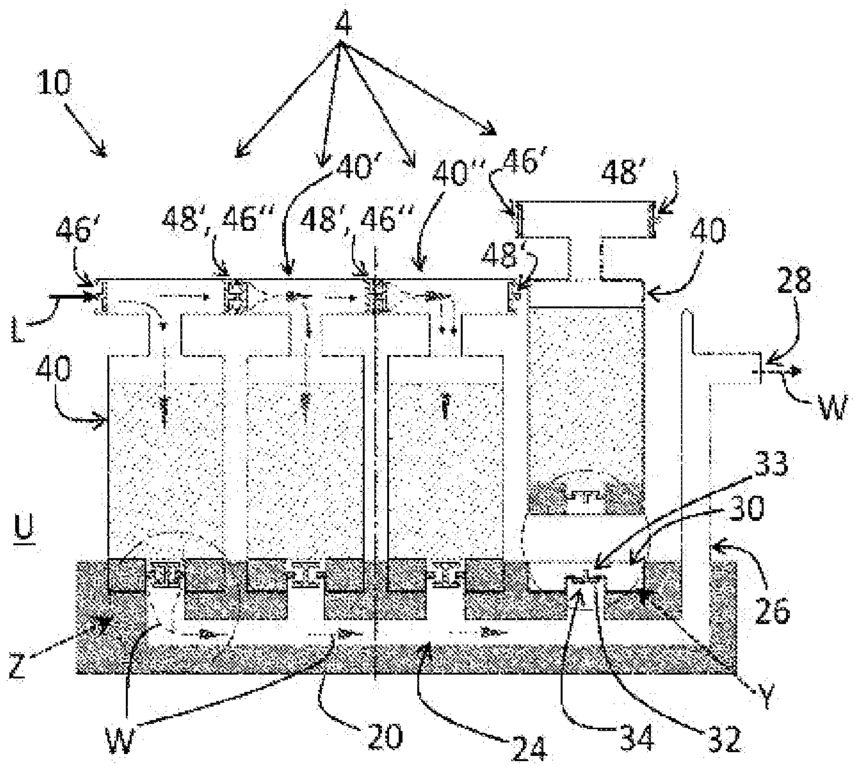
FIG. 2*a* schematic illustration of an oil-water-separating device according to the proposal.

In the case of the one shown in FIG. 2 schematically shown according to the proposed oil-water-separating device 10 is an oil-water-separating device 10 for removing oil-containing components from an oil-water mixture as a liquid to be purified L, which is used as condensate from a compressed-air process of the oil-water-separating device 10. The liquid L to be purified is purified by the oil-water-separating device 10 in such a way that purified liquid W is finally provided, which is essentially oil-free water which can be fed into the sewer system.

Figure 3:
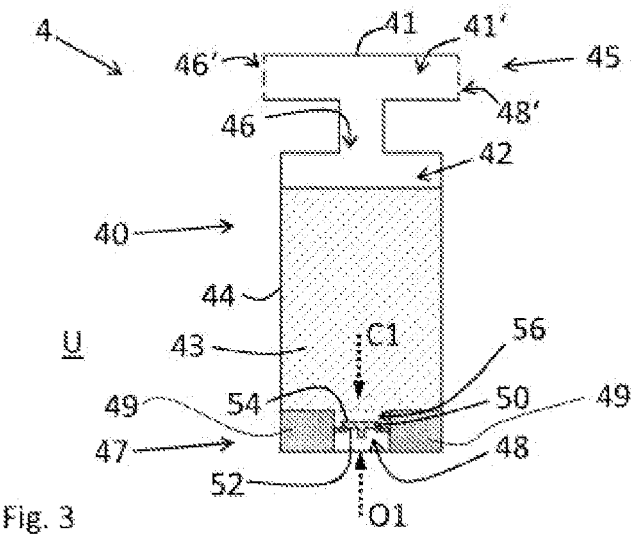
FIG. 3*a* schematic illustration of a filter unit in the form of a proposed filter cartridge.

The proposed oil-water-separating device 10 comprises a base unit 20, which is also described in detail in FIG. 4, to which reference is made at the same time in the following description simultaneously. Furthermore, the oil-water-separating device 10 shown has three already connected filter units 4 in the form of the three filter cartridges shown on the left 40, 40', 40". Another filter cartridge 40 is shown on the right, but in a condition that is not integrated into the oil-water-separating device 10, i.e., not connected to the base unit 20. A single proposed filter cartridge 40 is also shown in FIG. 3, which is also referred to in the following description simultaneously. Furthermore, in FIGS. 5 and 6 respectively, the detailed views Y and Z of FIG. 2 are enlarged, which is also referred to in the following description simultaneously.

The proposed filter unit 4, which is set up as a filter cartridge 40 for detachable connection to and re-disassembly from the oil-water-separating device 10, has a filter interior 42 in which adsorption filter material 43 for adsorption of dispersed oil is arranged. A housing 44 separates the filter interior 42 from an environment U. For the purpose of filtering the oil constituents, the liquid L to be cleaned is fed to the filter interior 42 by being directed through an inflow opening 46 to provide an inflow of the liquid L to be cleaned into the filter interior 42. Downstream of the adsorption filter material 43, the housing 44 comprises a outflow opening 48 for providing an outflow of purified liquid from the filter interior 42. The outflow opening 48 is assigned to a bottom side 47 of the filter cartridge 40.

It is essential for the proposed filter cartridge 40 that the outflow opening 48 of the housing 44 is designed to be closable by means of an automatic filter cartridge closure 50. In this case, the automatic filter cartridge closure 50 in the exemplary embodiment shown in the present case and thus preferred is designed to be interchangeable between an open state to enable the outflow of purified liquid from the filter interior 42 and a closed state to prevent the outflow of purified liquid from the filter interior 42. The closed state of the automatic filter cartridge closure 50 is shown, in particular, in FIG. 3 but also with the rightmost filter cartridge 40 in FIG. 2 or in the detailed view Y in FIG. 5*a*). The open state, in turn, is shown in FIG. 2 for the three filter cartridges 40', 40" arranged on the left, as well as being shown in detail in FIG. 6.

The proposed base unit 20 of the oil-water-separating device 10 comprises at least one inflow opening 22 on the input side, in the case shown, four inflow openings 22 for the introduction of liquid W purified in the upstream filter unit 4. In principle, the inflow openings 22 each provide access for the purified liquid W into a manifold 24. In turn, the purified liquid W is transferred via the manifold 24, specifically into a riser 26, which is in fluid connection with the manifold 24 for this purpose. Finally, riser 26 is set up to outflow the purified liquid W via an outflow opening 28 provided downstream, through which the purified liquid W can ultimately be fed into the sewer system, for example.

It is essential for the proposed base unit 20 that at least one filter receptacle 30 is provided (in the specific case shown there are four filter receptacles 30), and that the filter receptacle 30 is set up for detachable connection and re-disassembly of the upstream filter unit 4 in the form of filter cartridge 40. According to the proposal, the inflow opening 22 is arranged in the area of the filter receptacle 30 and is designed to be closable by means of an automatic collector closure 32. The automatic collector closure 32 separates the manifold 24 from the environment U. Furthermore, in the exemplary embodiment shown in the present case and being thereby preferred, the automatic collector closure 32 is designed to be interchangeable between an open state to enable the outflow of the liquid W purified in the upstream filter unit 4 and a closed state for closing a fluid connection between the manifold 24 and the environment U or the filter interior 42 of the upstream filter cartridge 40.

Figure 5:
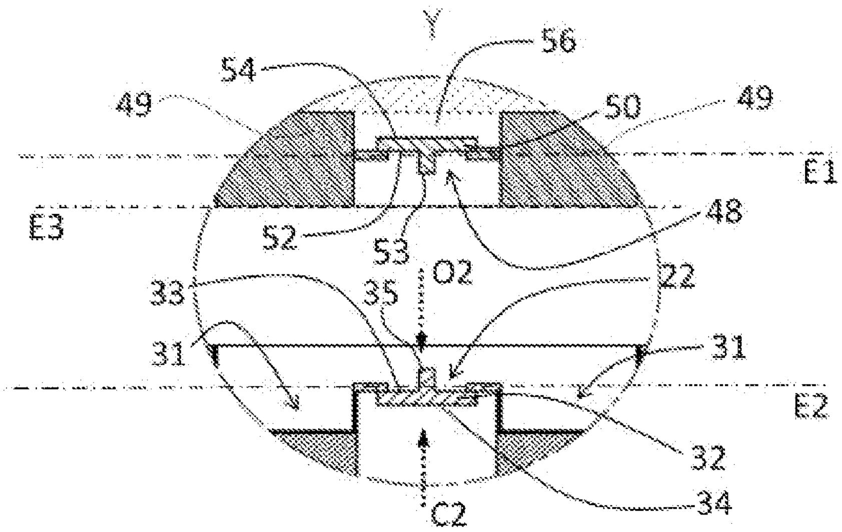
FIG. 5 in view a), the detailed view Y from FIG. 2, as well as, in view b), the automatic collector closure and the automatic filter cartridge closure in individual views.
Figure 5:
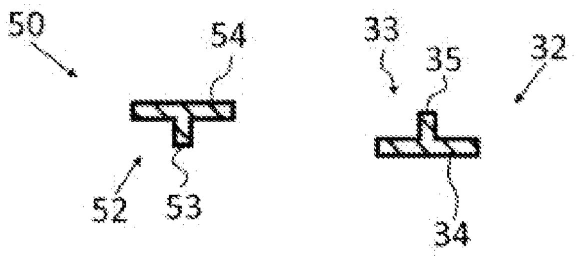
Figure 6:
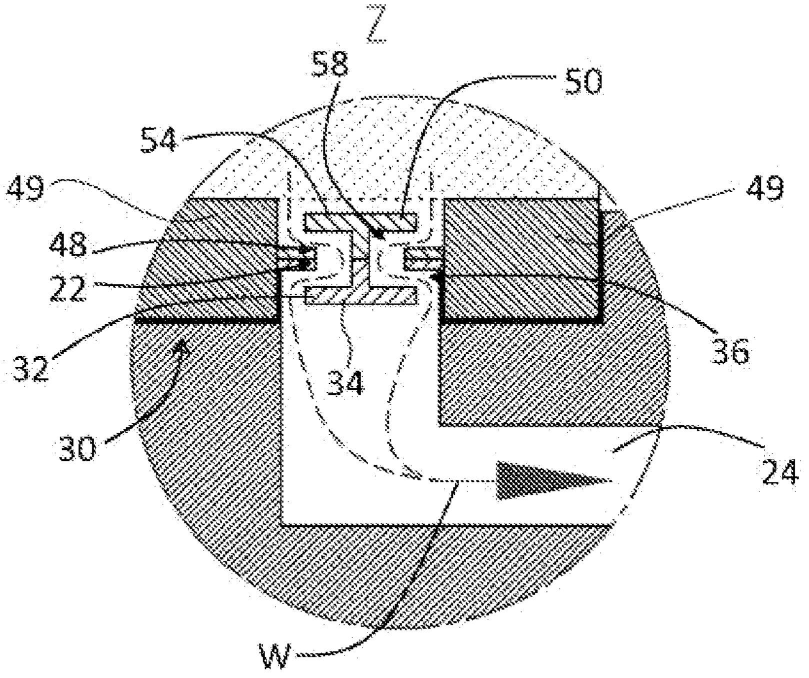
FIG. 6 the detailed view Z from FIG. 2.

In the proposed oil-water-separating device 10, the proposed base unit 20 and the proposed filter cartridge 40 correspond and interact with each other in a particularly favourable manner. According to the proposal, replaceable and easy-to-use filter cartridges 40 are provided that interact in a simple way with the base unit 20 of the oil-water-separating device 10 and, above all, can be installed and disassembled without special additional handing for opening or closing. The system comprises base unit 20 with filter receptacles 30 for the filter cartridges 40, 40', 40" and the filter cartridges 40, 40', 40" itself is favourably coordinated. For example, the outflow openings 48 of the filter cartridges 40 are always closed via the respective automatic filter cartridge closure 50 (FIGS. 3 and 5*a*)). This condition is referred to as the closed state of the filter cartridge closure 50. However, the outflow openings 48 can be opened completely automatically during installation, i.e., without the need for any special steps (FIG. 2: right; and FIG. 6). Specifically, the insertion of the filter cartridge 40 into the corresponding filter receptacle 30 of the base unit 20 ensures that the automatic filter cartridge closure 50 changes from its closed state to the open state without the need for the user to actively open the filter cartridge closure 50 for example. Similarly, the disassembly of the filter cartridge 40 from the base unit 20 of the oil-water-separating device 10 ensures that the filter cartridge closure 50 in the open state changes again to its closed state without the need for active closing by the user.

During the opening process, this is ensured by the opening force O1, which is shown in FIG. 3 is indicated by the lower dotted arrow. The automatic filter cartridge closure 50 is thus set up in such a way that the opening force O1 moves the automatic filter cartridge closure 50 from the closed state to the open state. The opening force O1 is directed onto an outer side 52 of the automatic filter cartridge closure 50 facing the environment U. Specifically, the opening force O1 is directed in the direction of the filter interior 42. When a certain specified opening force O1 is applied, the automatic filter cartridge closure 50 is moved in the direction of the filter interior 42 and thus into the space shown in FIG. 6 apparent open state.

The effect of the opening force O1 is ensured by the sole placement or insertion of the filter cartridge 40 into the intended filter receptacle 30. Thus, the filter cartridge 40 with its bottom side 47 is inserted into the filter receptacle 30 or there, specifically into the recesses 31. In this case, a filter-cartridge contact surface 53 strikes a collector contact surface 35. This is particularly evident from the synopsis of FIGS. 5 and 6, wherein from FIG. 5 *b*), the embodiment of the two closures is again evident, an automatic filter cartridge closure 50 as well as an automatic collector closure 32.

In the illustrated and therefore preferred exemplary embodiment, the filter-cartridge contact surface 53 is set back with relation to a bottom-side plane E3 of the filter cartridge 40. In addition, the opening plane E1 defined by the outflow opening 48 is set back from the filter-cartridge contact surface 53. Ultimately, the filter-cartridge contact surface 53 itself is formed on the outer side 52 of the automatic filter cartridge closure 50 facing the environment U.

With regard to the collector contact surface 35, on the other hand, it is provided that it is designed on the outer side 33 of the automatic collector closure 32 facing the environment U. Furthermore, the collector contact surface 35 is set back with relation to the opening plane E2 defined by the inflow opening 22 into the manifold 24 of base unit 20.

A typical process of connecting the filter cartridge 40 to the base unit 20 is described below. Thus, the filter-cartridge contact surface 53 formed on the outer side 52 of the automatic filter cartridge closure 50 meets the upper outer side 32 of the automatic collector closure 32, specifically against the collector contact surface 35. As a result, the automatic filter cartridge closure 50 is moved upwards and moved to its open state in addition to, simultaneously, the automatic collector closure 32 being moved downwards and also being moved into its open state, as is made evident from the following description of the other figures.

During the closing process, in turn, a clamping force C1, which is shown in FIG. 3 is indicated by the upper dotted arrow, for the automatic closing of the outflow opening 48. The automatic filter cartridge closure 50 is set up in such a way that the clamping force C1 moves the automatic filter cartridge closure from the open state to the closed state. The closing force is directed to an inner side 54 of the automatic filter cartridge closure 50 facing the filter interior 42, specifically away from the filter interior 42 and in the direction of the environment U. The clamping force C1 can at least be at least partially exerted by the liquid or liquid to be cleaned onto the inner side 54 of the automatic filter cartridge closure 50 located in the filter interior 42. This enables a fast automatic closing process. This is because, as soon as no opening force O1 is exerted to keep the automatic filter cartridge closure 50 in its open state, the liquid arranged in the filter cartridge 40 exerts pressure onto the inner side 54 in such a way that the closing force C1 is automatically provided. The automatic filter cartridge closure 50 is then moved by the force exerted by the liquid from the open state shown in FIG. 6 into the closed state shown in FIG. 3 and FIG. 5*a*).

In order to ensure the displacement of the automatic filter cartridge closure between the closed and open state, a free space 56 is arranged between the outflow opening 48 and the adsorption filter material 43.

Figure 7:
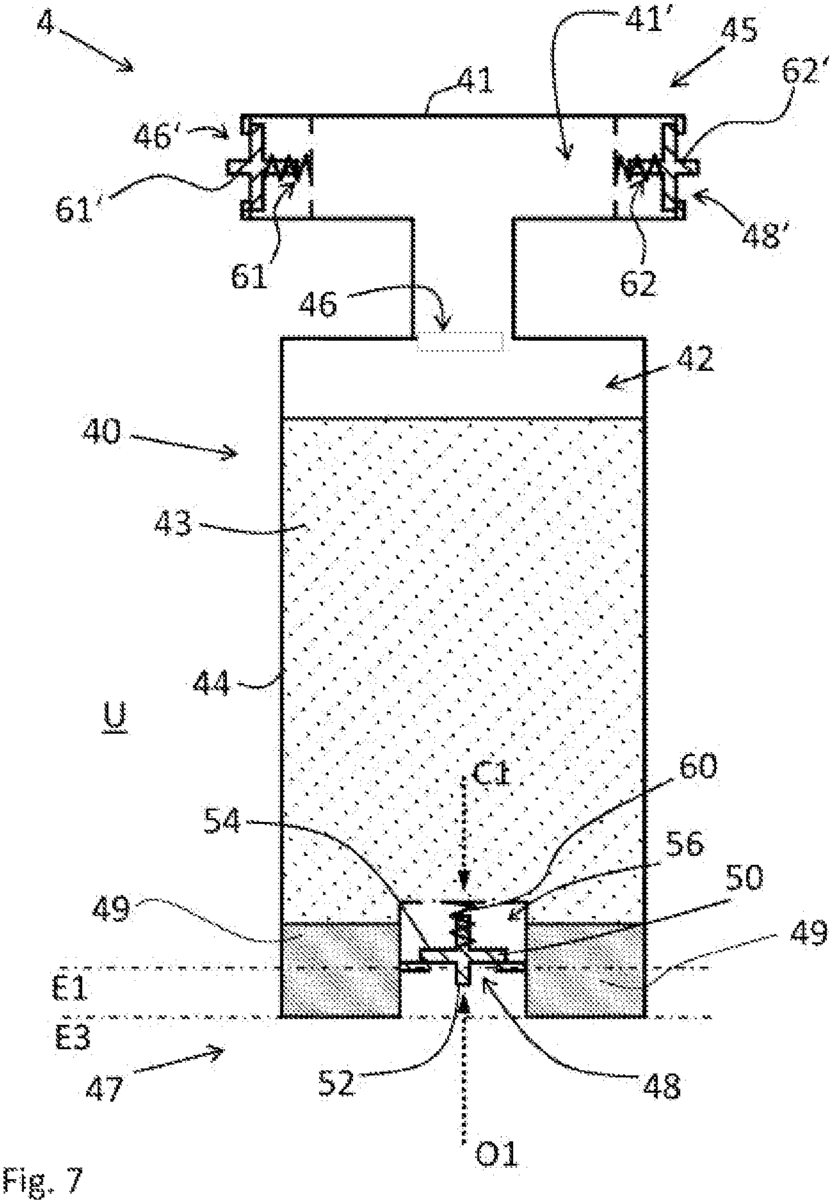
FIG. 7*a* further schematic illustration of a filter unit in the form of another proposed filter cartridge.

In FIG. 7 in turn, another exemplary embodiment of a filter cartridge 40 is shown, wherein the same reference numbers basically characterize the same features and reference can be made to the preceding and also below description. In contrast to the filter cartridge 40 from FIG. 3, in the case of the exemplary embodiment shown in FIG. 7, a spring

60 is also provided, namely subsequently arranged on the inner side 54 of the automatic filter cartridge closure 50. In this embodiment, the clamping force C1 described above is at least partially exerted by this spring 60 on the inner side 54 of the automatic filter cartridge closure 50. For this purpose, the liquid to be cleaned or the cleaned liquid located in the filter interior 42 can also at least partially exert the clamping force C1 onto the inner side 54 of the automatic filter cartridge closure 50.

Figure 4:
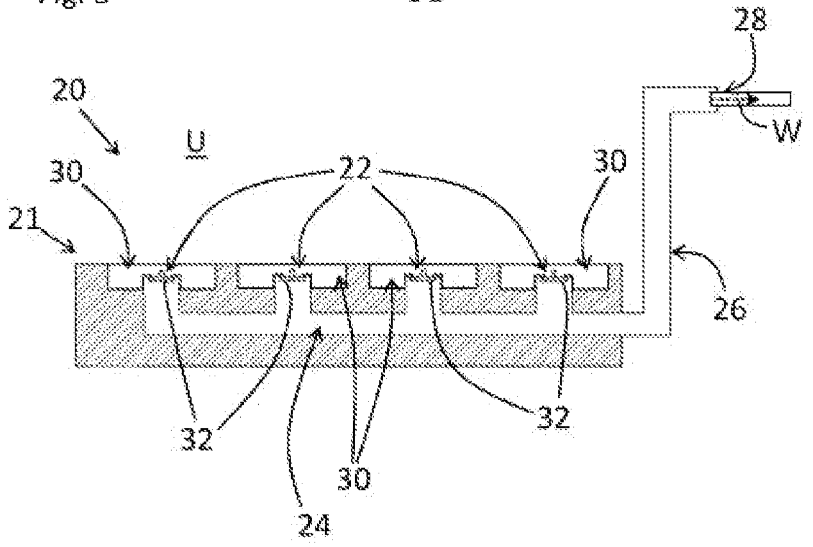
FIG. 4*a* schematic illustration of a proposed base unit.

On the other hand, the proposed base unit 20, which is shown as an example in FIG. 4 is designed with 3D filter receptacles, in the specific case shown with four 3D filter receptacles, for the filter units to be connected in the form of the 40, 40', 40" filter cartridges. The filter receptacle 30 represents the connection point and a mechanical interface between the upstream filter cartridge 40 and the manifold 24 connecting to this filter cartridge 40 for collecting or conveying on the purified liquid W forward. The interface ultimately provides the inflow opening 22 into the base unit 20. The inflow opening 22 is always closed automatically via the automatic collector closure 32, meaning without the need for special handling, but can also be opened automatically, meaning without separate handling. Specifically, the insertion of a corresponding filter cartridge 40 into the filter receptacle 30 of the proposed base unit 20 ensures that the automatic collector closure 32 changes from its closed state to the open state without the need for the user to actively open a collector closure for example. Similarly, the disassembly of the filter cartridge 40 from the base unit 20 of the oil-water-separating device 10 also ensures that the automatic collector closure 32, which was previously in the open state, changes to its closed state without the need for active closing by the user.

If a filter cartridge 40, 40', 40" is not inserted on the base unit 20, it closes automatically by moving the automatic filter cartridge closure 50 to its closed state. The automatic filter cartridge closure 50 makes the service cleaner and easier, as no water can drip out of the filter cartridge 40, 40, 40" and onto the base unit 20. Each filter receptacle 30 of the base unit 20, in turn, closes just as automatically if no filter cartridge 40, 40', 40" is attached. This allows the variation of the number of filter cartridges 40, 40', 40" with the same base unit 20 without water escaping.

In the exemplary embodiment shown in concrete terms, four filter receptacles 30 are provided, into which four filter cartridges 40 can be inserted. However, more or less cartridge locations in the form of more or less filter receptacles 30 can also be provided and thus more or less filter cartridges 40 can be connected. In particular, in the case of the proposed oil-water-separating device 10, not all filter receptacles 30 need to be occupied by filter cartridges 40 since the filter receptacles 30 or, in particular, the inflow openings 22 arranged in them are automatically closed in their initial state if no filter cartridge 30 is held in them. This makes it particularly easy to change filter cartridges 40 in the proposed oil-water-separating device 10.

Thereby, preferably, the entire system in the form of the oil-water-separating device 10 can also continue to operate as long as at least one filter cartridge 40 remains arranged in its position in the form of the filter receptacle 30, thereby remaining connected to the base unit 20 and remaining integrated into the overall system. In order to remove a filter cartridge 40, the filtering process of the liquid L to be cleaned does not have to be stopped or adapted with a lot of effort. Of course, principally, it can also be provided that the filtering process is stopped in order to replace a single filter cartridge 40.

The opening and closing process of the automatic collector closure 32 is similar to that of the automatic filter cartridge closure 50. The automatic collector closure 32 is set up in such a way that an opening force O2 (upper dotted arrow in FIG. 5*a*)) moves the automatic collector closure 32 from the closed state to the open state. For this purpose, the automatic collector closure 32 is moved from the upper position shown in FIG. 5*a*) and in FIG. 4 into the lower position shown in FIG. 6. The opening force O2 is directed to an outer side 33 of the automatic collector closure 32 facing the environment U, and specifically in the direction of the manifold 24. This opening process can be carried out as described by simply inserting the filter cartridge 40 by the automatic filter cartridge closure 50 with the filter-cartridge contact surface provided ion its outer side 52 impacting onto the outer side 33 of the automatic collector closure 32 onto the collector contact surface 35. As a result, both the automatic filter cartridge closure 50 as well as the automatic collector closure 32 are moved back in their positions and both are returned to their open states.

Furthermore, the automatic collector closure 32 is set up in such a way that a clamping force C2 (lower dotted arrow in FIG. 5*a*)), which is directed onto an inner side 34 of the automatic collector closure 32 facing the manifold 24, specifically, in the direction of the environment U and away from the manifold 24, moves the automatic collector closure 32 from the open state to the closed state. It is particularly favourable that the purified liquid W located in the manifold 24 at least partially exerts clamping force C2 onto the inner side 34 of the automatic collector closure 32. This enables the fast, automatic closing process. This is because, as soon as no opening force O2 is exerted to keep the automatic collector closure 32 in its open state, the liquid arranged in the manifold 24 exerts pressure onto the inner side 34 so that the closing force C2 is automatically provided. The automatic collector closure 32 is then controlled only by the force exerted by the purified liquid W from the one shown in FIG. 6 to the open state shown in FIG. 4 and FIG. 5 depicted closed state moved upwards.

Figure 8:
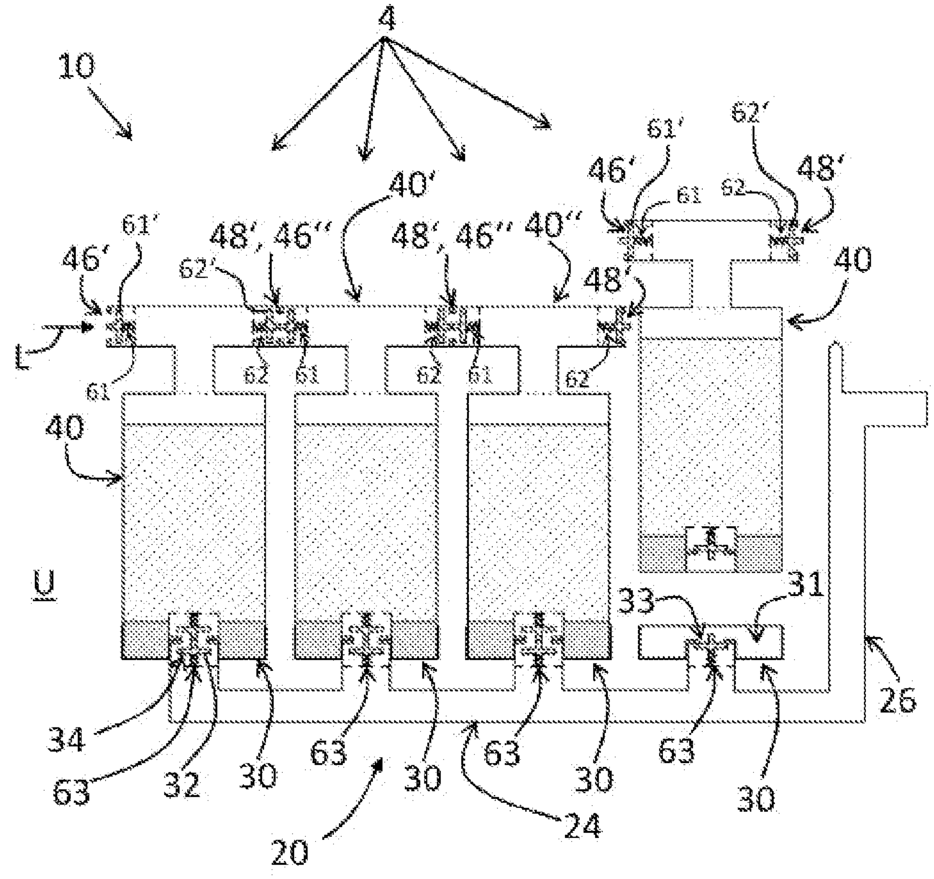
FIG. 8*a* further schematic illustration of another proposed oil-water-separating device with filter cartridges in accordance with FIG. 7.

However, it can also be adapted to a further embodiment of the base unit 20 or the oil-water-separating device 10, as shown in FIG. 8, it is provided that a spring 63 is subsequently arranged on the inner side 34 of the automatic collector closure 32 and that the clamping force C2 on the inner side 34 of the automatic collector closure 32 is at least partially exerted by this spring 63. This spring force may act alternatively or in addition to the force exerted by the purified liquid W located in the manifold 24 on the automatic collector closure 32.

The other features of the oil-water-separating device 10 shown in FIG. 8 are essentially derived from the preceding as well as the following description of the oil-water-separating device 10, as is also illustrated in FIG. 2. In this respect, the same reference numbers also refer to the same features so that the corresponding description can be transferred to the exemplary embodiment in accordance with FIG. 8.

In the case of the oil-water-separating device 10 according to the proposal, the described closures in the form of the automatic filter cartridge closure 50 and the automatic collector closure 32 interact with each other in a special way. The filter cartridge 40 corresponds to the filter receptacle 30 in such a way that when the filter cartridge 40 is held in the filter receptacle 30, the automatic filter cartridge closure 50 and the automatic collector closure 32 collide in such a way that both the automatic filter cartridge closure 50 as well as the automatic collector closure 32 are each moved to the open state. This is shown in FIG. 6.

In the open state of the automatic filter cartridge closure 50, a flow channel 58 is formed between an outer side 52 facing the environment U (for the sake of clarity not provided in FIG. 6, but provided with reference numbers in FIGS. 3 and 5) of the automatic filter cartridge closure 50 and the housing 44 in the area of the outflow opening 48. In this open state, the flow channel 58 provides a fluid connection from the filter interior 42 to the outside. In this case, the direction description to the outside is to be understood as the fact that the fluid connection leads out of the filter interior 42. Specifically, this should and will be discussed in the case shown in FIG. 2 at the three left-hand spaces and in FIG. 6 in the case of a connected filter cartridge 40, i.e., inserted into the filter receptacle 30, a fluid connection is achieved which provides the filter interior 42 with the subsequent manifold 24 of the base unit 20 of the proposed oil-water-separating device 10.

In the open state of the automatic collector closure 32, in turn, a flow channel 36 is also formed. The flow channel 36 is formed between an outer side 33 facing the environment U (for the sake of clarity not in FIG. 6 but provided with reference numbers in FIGS. 2 and 5) of the automatic collector closure 32 and the base unit 20 in the area of the inflow opening 22. The flow channel 36 provides a fluid connection from the outside into the manifold 24. In this case, the direction description from the outside is to be understood to mean that the fluid connection leads into the manifold, specifically from the filter interior 42 of the upstream filter cartridge 40.

For this purpose, the two openings in the form of the outflow opening 48 of the filter cartridge 40 and the inflow opening 22 in the base unit 20 are brought into correspondence with one another. Thus, the flow channels 36, 58 are designed to direct the purified liquid W from the filter cartridge 40 to the base unit 20 (marked with the dashed arrows in FIG. 6). The flow channels 36, 58 are formed automatically when the respective automatic closures (automatic filter cartridge closure 50 and automatic collector closure 32) are moved to their open states. On the other hand, the flow channels 36, 58 are automatically closed again when the respective automatic closures (automatic filter cartridge closure 50 and automatic collector closure 32) are moved to their closed states.

In the respective closed states described, an escape of condensate or purified liquid W from the filter cartridge 40 or the base unit 20 is quickly and effectively prevented. In this way, the replacement of filter cartridges 40 can be carried out particularly cleanly, i.e., without dripping and thus contamination of the base unit 20 of the proposed oil-water-separating device 10. It is particularly favourable that the outflow opening 48, and thus also the flow channel 58 formed in the open state of the automatic filter cartridge closure 50, is closed in the closed state of the automatic filter cartridge closure 50 in such a way that, in an outdoor area, the outer side 52 of the automatic filter cartridge closure 50 has an operative connection with an inner surface of the housing 44 in a sealing manner. The inner surface of the housing 44 is the area facing the filter interior 42 or facing away from the environment U. For example, in the case of an essentially round automatic filter cartridge closure 50, the outer ring area of the automatic filter cartridge closure 50 is the outer ring area of the automatic filter cartridge closure 50.

This applies analogously to the base unit 20 and the interaction between the inflow opening 22 and the automatic collector closure 32. Being particularly favourable, the inflow opening 22 and thus also the flow channel 36 formed in the open state of the automatic collector closure 32, is closed in the closed state of the automatic collector closure 32 in such a way that, in an outdoor area, the outer side 33 of the automatic collector closure 32 has an operative connection with an inner surface of the base unit 20 in a sealing manner. The inner surface of the base unit 20 is the surface facing the manifold 24 or facing away from the environment U. For example, in the case of an essentially round automatic collector closure 32, the outer area of the automatic collector closure 32 is the outer ring area of the automatic collector closure 32.

In order to ensure the simplest possible connection of the filter cartridge 40 to the base unit 20, at least one projection 49 for positioning the filter cartridge 40 is provided on one bottom side 47 of the filter cartridge 40. The bottom side 47 of the filter cartridge 40 is the side facing downwards for the purpose of mounting. The outflow opening 48 is assigned to this bottom side 47 of the filter cartridge 40. An opening plane E1 is defined by the outflow opening 48, as shown by the upper dash-dotted line in FIG. 5*a*). The projection 49 is formed in relation to this opening plane E1 of the outflow opening 48. Accordingly, with relation to the opening plane E1, the projection projects outwardly, thereby projecting further away from the essential part of the body of the filter cartridge 40 with relation to the outflow opening 48. The projection 49 is designed here as a circumferential edge. The projection 49 is used for easy insertion and connection of the filter cartridge 40 to the base unit 20. This is implemented by the fact that the projection 49 is designed for positioning the filter cartridge 40 in the filter receptacle 30 of the base unit 20 of the oil-water-separating device 10 corresponding to the projection 49.

For this purpose, the filter receptacle 30 of the base unit 20 comprises a recess 31. This recess 31 is designed to hold the corresponding projection 49 of the filter cartridge 40. Fig. FIG. 6 shows the state in which the projection is held in the recess 31 (not marked with reference numbers in FIG. 6). The recess 31 and the projection 49 form a mechanical interface for coupling the filter cartridge 40 with the base unit 20. This enables simple and unambiguous positioning, thereby providing for easy installation.

The inflow opening 22, which is assigned to a top side 21 of the base unit (FIG. 2), defines an opening plane E2, as is shown in FIG. 5 *b*y the bottom dash-dotted line. The recess 31 is formed at this top side 21 of the base unit specifically within the filter receptacle 30. The recess 31 is designed all around in order to be able to hold the projection 49, which is designed as a circumferential edge. The recess 31 is set back with relation to the opening plane E2 of the inflow opening 22. As a result, the recess 31 projects deeper into the base body of base unit 20 than the area of inflow opening 22, which therefore projects outwardly with relation to the recess 31. This ensures easy installation of the filter cartridge 40 and a stable connection between the filter cartridge 40 and the base unit 20.

The overall arrangement of the proposed oil-water-separating device 10 is particularly well illustrated in FIG. 2 or, alternatively, this is also evident in FIG. 8. In the exemplary embodiment shown, the oil-water-separating device comprises the base unit 20 arranged below, which is fixed in position during operation, and above it, there are filter cartridges 40, 40', 40" connected to the base unit 20. Specifically, a plurality of four filter cartridges 40', 40" are provided, wherein the left three filter cartridges 40, 40', 40" are inserted into the left three filter receptacles 30 of the base unit 20. The filter cartridge 40, which is arranged furthest to the right, has not yet been inserted into the right filter receptacle 30, or has just been disassembled from this filter receptacle 30.

The left filter cartridge 40 is connected to the adjacent filter cartridge 40' on the right, which in turn is connected to the adjacent filter cartridge 40" further to the right. Specifically, the inflow channels 41 (see FIG. 3) of the filter cartridges 40, 40', 40" are connected to each other. Each inflow channel 41 is arranged at the top of the respective filter cartridge 40, 40', 40". It is assigned to a top side 45 of the filter cartridge 40, 40', 40". Likewise, the inflow opening 46 is also assigned to the top side 45 of the respective filter cartridge 40, 40', 40".

The inflow channel 41 is located above the inflow opening 46 and is in fluid connection with the inflow opening 46. Ultimately, on the one hand, the inflow channel 41 ensures that the liquid L to be cleaned is fed to the filter interior 42. On the other hand, the inflow channel 41 also comprises a junction 41' for conveying a part of the liquid L forward to be cleaned into the adjacent filter cartridge 40', 40". In this way, the plurality of filter cartridges 40, 40', 40" can be connected in parallel in the oil-water-separating device 10. As a result, a part of the liquid L to be cleaned is cleaned in the respective filter cartridge 40 or 40' (cf. the solid arrows arranged above in FIG. 2), and a part in the respective adjacent filter cartridge 40' or 40" is cleaned (cf. the dashed arrows arranged above in FIG. 2).

In the case of filter units 4 in the form of filter cartridges 40, 40', 40", the inflow channel 41 comprises an inflow opening 46' or 46" for the initial entry of the liquid L to be cleaned into the filter cartridge 40 or into the adjacent filter cartridge 40', 40". This is used to introduce the liquid L to be cleaned initially in relation to the respective filter cartridge 40, 40', 40". As described, a part is then forwarded via the respective inflow opening 46 to the filter interior 42 for filtering in the respective filter cartridge 40 itself, while another part is conveyed forward to the adjacent filter cartridge 40', 40" connected in parallel. For this purpose, the inflow channel 41 comprises the said junction 41' as well as a junction opening 48' closing this junction 41'. The junction opening 48' is designed to convey a part of the liquid L to be cleaned out of the filter cartridge 40 forward into the adjacent filter cartridge 40', 40".

For this purpose, the junction opening 48' of a filter cartridge 40 is brought into correspondence with the inflow opening 46" of an adjacent filter cartridge 40', as indicated in FIG. 2. The 48' junction opening is designed for fluid-tight connection to the 46" inflow opening of an adjacent 40', 40" filter cartridge.

The junction opening 48' is also designed to be changeable between an open state and a closed state. In principle, this also applies to the inflow openings 46', 46". In Fig. For example, in paragraph 2, the inflow channel 41 of the right of the three connected filter cartridges 40" is only open with regard to its access in the form of the 46" inflow opening but is closed with regard to its 48' junction opening. The filter cartridge 40 that is still to be inserted or has just been disassembled, which is shown on the far right in FIG. 2, is even closed with regard to both the inflow opening 46' as well as the junction opening 48'.

By connecting a plurality of filter cartridges 40, 40', 40" in parallel, it is favourable that condensate does not have to be collected at great expense if a filter cartridge 40 to be replaced is changed. Rather, the operation of the proposed oil-water-separating device 10 can be continued with the remaining connected filter cartridges 40. In addition, it is favourable to react to flexible load situations. Thus, it is possible to react to larger contamination of the liquid L to be cleaned by occupying the base unit 20 of the proposed oil-water-separating device 10 with a plurality of filter cartridges 40, 40', 40", while in the case of less stressful operation or less stressful conditions, individual filter receptacles 30 of the base unit can remain free of filter cartridges 40. Filter cartridges can therefore be easily added or dispensed with/to adapt the performance of the system to the actual condensate build-up.

If the filter cartridges 40, 40', 40" are covered with too many oil particles, i.e., if a filter cartridge is no longer usable, they can be occasionally replaced. It is not necessary to replace the entire oil-water-separating device 10 or the base unit 20. Since only the filter cartridges are replaced, not the collector, resources are conserved.

Due to the parallel flow through the filter cartridges 40, 40', 40", the flow resistance of the entire system decreases, i.e., more condensate is processed at the same differential pressure. The 40, 40', 40" filter cartridges are designed in such a way that they can be easily carried by a service person without any aids in terms of weight and size, thus facilitating the servicing process.

The filter cartridges 40, 40' 40" of the proposed oil-water-separating device 10 flow into a common manifold 24. Here, the liquid width W cleaned by all connected filter cartridges 40.40', 40" is collected in the base unit 20. From there, it is conveyed forward to the one common riser 26. For this purpose, the manifold 24 flows into the common riser 26. The outflow opening 28 arranged at the end, i.e., the outflow of the proposed oil-water-separating device 10, is located relative to the filter cartridges 40, 40', 40", thereby being specifically raised relative to their outflow openings 48 and containing a storage volume. As a result, depending on the operating mode of the overall system, a small part of the treated water W can flow back into the filter cartridges 40, 40', 40" after an outflow process. This reverse flow leads to a dynamization of the filter bed, thereby counteracting blockage due to slime. The basic function of riser 26 is to ensure that the filters of the filter cartridges 40', 40" remain wetted with condensate and do not dry out.

The description given can also essentially be transferred to the exemplary embodiment of the oil-water-separating device 10 in FIG. 8. In contrast to the exemplary embodiment in accordance with FIG. 2, in the case of the oil-water-separating device 10 in FIG. 8, only four filter cartridges 40 in accordance with FIG. 7 are provided, instead of the filter cartridges 40 in accordance with FIG. 3, as is indicated in FIG. 2. The filter cartridges 40 in accordance with FIG. 7 and, thereby, also the oil-water-separating device 10 in FIG. 8 are distinguished by the embodiment of the top sides 45 of the filter cartridges 40. Automatic closures are also provided here. namely, on the one hand, the automatic inflow closures 61, which can automatically close and open the respective inflow opening 46' into the inflow channel 41. On the other hand, automatic junction closures 62' are provided, which can automatically close and open the respective junction opening 48' into the adjacent filter cartridge 40". The mode of operation is similar to the automatic closures described above in the form of the automatic collector closure 32 or the automatic filter cartridge closure 50, which is why reference can be made to the description. Furthermore, springs 61 and 62 are also provided, respectively, which can push the automatic inflow shutter 61' or the automatic junction shutter 62' into the closed state in an analogous way.

Figure 9:
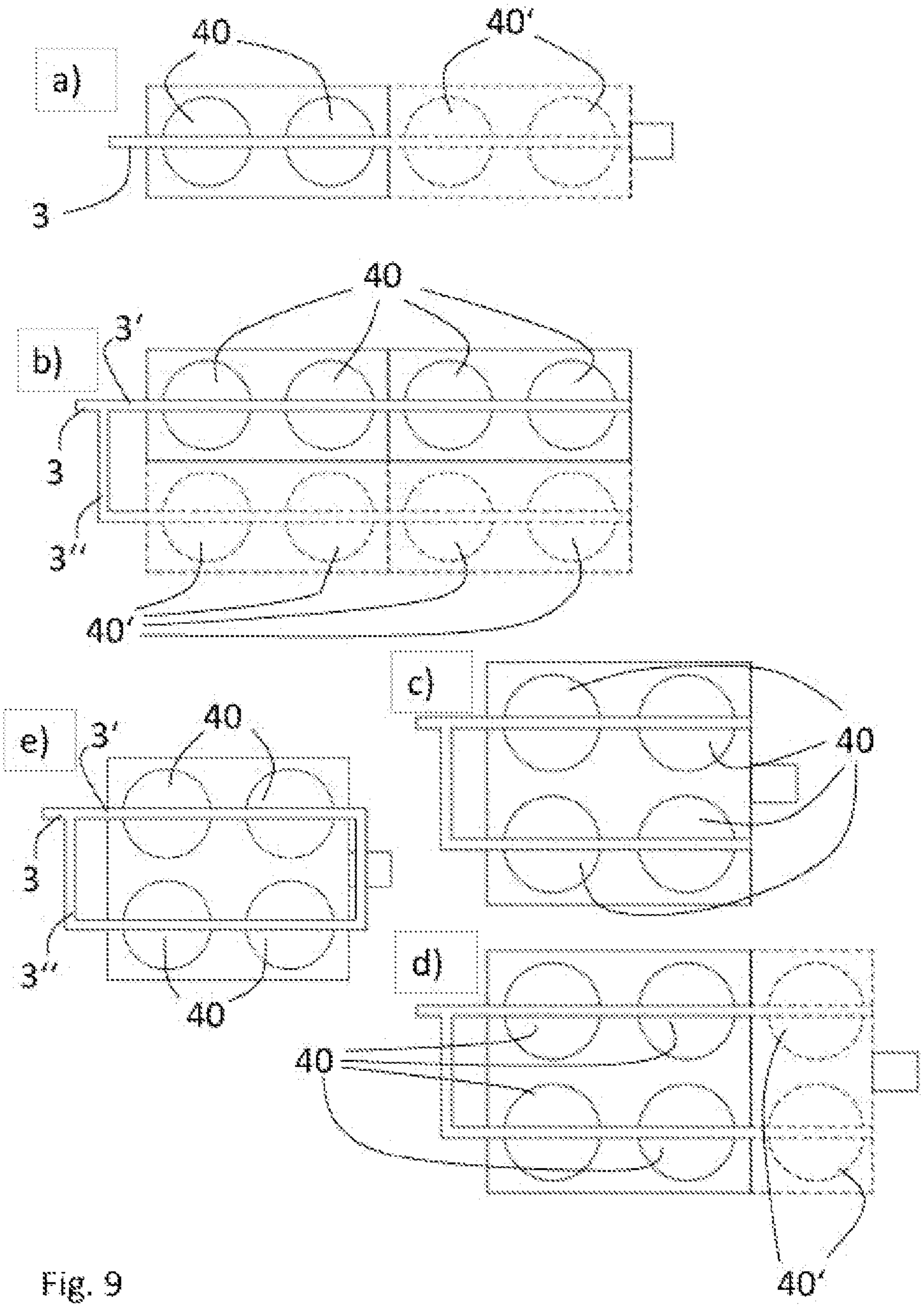
FIG. 9 basic arrangements of the proposed filter cartridges in different oil-water-separating devices in views a) to e).

The base unit 20 in the one shown in FIGS. 2, 4, 5, 6 and 8 comprise four spaces or filter receptacles 30 for filter cartridges 40, 40', 40". In principle, the proposed base unit 20 is flexible. The base unit 20 is expandable. In FIG. 9, five different cases are schematically shown in views a), b), c), d) and e). In accordance with view a), two filter cartridges 40 already arranged in a row adjacent to each other are connected to two further filter cartridges 40' arranged in a row adjacent (marked using dashes). The arrangement according to view (b) corresponds essentially to the arrangement according to view (a), wherein four further filter cartridges 40, 40' are lined up parallel to the four filter cartridges 40, 40' arranged in a row adjacent to each other. According to view c), four filter cartridges 40 are arranged in a 2×2 block. According to view d), this 2×2 block of four filter cartridges 40 is supplemented by two more filter cartridges 40' in accordance with view c. In all illustrations in accordance with FIG. 9, the filter cartridges 40, 40' are connected in parallel in their entirety so that, occasionally, filter cartridges 40' can be exchanged or even closed in the manner described without any problems. In the above-mentioned views b), c) and d), the inflow channel 3 is divided into two junctions 3' and 3". In principle, the system is very flexible, since, for example, individual filter cartridges 40 or 40' can be decoupled from the inflow channel 3 or a junction 3' or 3". In an favourable way, this can also be done preferentially without having to stop the entire system and stop the filtering process. The system is also designed to be particularly flexible in accordance with view e), in which the inflow channel 3 is also divided into the two junctions 3' and 3", but this is designed as a ring line.

In principle, it is possible, but not necessary, for individual filter cartridges 40' to be replaced during operation.

In the case of oil-water-separating devices 10 with a plurality of filter cartridges 40, 40', 40", identical filter cartridges 40, 40', 40" are preferably used as adjacent filter cartridges.

The invention claimed is:

1. A filter unit for integration into an oil-water-separating device for removal of oil-containing components from an oil-water mixture, wherein the filter unit comprises: a housing separating a filter interior from an environment, wherein a filter material is arranged in the filter interior for at least partial removal of oil from the oil-water mixture, said filter material being an adsorption filter material for the adsorption of dispersed oil, wherein an inflow opening is provided for providing an inflow of liquid to be purified into the filter interior, and wherein the housing downstream of the filter material comprises an outflow opening for providing an outflow of purified liquid from the filter interior, wherein the filter unit is configured as a filter cartridge for detachable connection to and for disassembling from the oil-water-separating device again, and wherein the outflow opening of the housing is configured to be closable by an automatic filter cartridge closure, wherein the automatic filter cartridge closure is designed to be moved from a closed state to prevent the outflow of purified liquid from the filter interior to an open state to allow the outflow of purified liquid from the filter interior, wherein a filter-cartridge contact surface is provided to rest against a downstream component of the oil-water-separating device during operation of the oil-water-separating device, that the filter-cartridge contact surface is set back from a bottom-side plane of the filter cartridge, being that an opening plane defined by the outflow opening is set back with relation to the filter-cartridge contact surface.

2. The filter unit according to claim 1, wherein the automatic filter cartridge closure is arranged in such a way that an opening force directed onto an outer side of the automatic filter cartridge closure facing the environment, and, in the direction of the filter interior, moves the automatic filter cartridge closure from the closed state to the open state.

3. The filter unit according to claim 1, wherein the filter-cartridge contact surface is formed on an outer side of the automatic filter cartridge closure facing the environment.

4. The filter unit according to claim 1, wherein the automatic filter cartridge closure is designed to alternate between the open state to allow the outflow of purified liquid from the filter interior and the closed state to prevent the outflow of purified liquid from the filter interior.

5. The filter unit according to claim 1, wherein the automatic filter cartridge closure is arranged in such a way that a closing force directed onto an inner side of the automatic filter cartridge closure facing the filter interior and, in the direction of the environment moves the automatic filter cartridge closure from the open state to the closed state.

6. The filter unit according to claim 1, wherein a spring is adjacent to an inner side of the automatic filter cartridge closure and a closing force is at least partially exerted onto the inner side of the automatic filter cartridge closure, and/or that the liquid or liquid to be cleaned located in the filter interior at least partially exerts the closing force onto the inner side of the automatic filter cartridge closure.

7. The filter unit according to claim 1, wherein, in the open state of the automatic filter cartridge closure, a flow channel is formed between an outer side of the automatic filter cartridge closure facing the environment and the housing in the area of the outflow opening, wherein the flow channel provides a fluid connection from the filter interior to an outside.

8. The filter unit according to claim 7, wherein the outflow opening, and, the flow channel formed in the open state of the automatic filter cartridge closure, is closed in the closed state of the automatic filter cartridge closure in such a way that, in an outdoor area, an outer side of the automatic filter cartridge closure facing the environment has an operative connection with an inner surface of the housing facing the filter interior in a sealing manner.

9. The filter unit according to claim 1, wherein the inflow opening is assigned to a top side of the filter cartridge and the outflow opening is assigned to a bottom side of the filter cartridge, and that an inflow channel is provided, wherein the inflow channel is located above the inflow opening and is in fluid connection with the inflow opening, and wherein the inflow channel further has a junction for conveying a part of the liquid to be purified forward into an adjacent filter cartridge.

10. The filter unit according to claim 9, wherein the inflow channel has an inflow opening for initial entry of the liquid to be purified into the filter cartridge and a junction opening for conveying a part of the liquid to be purified out of the filter cartridge into an adjacent filter cartridge, wherein the junction opening is designed to alternate between an open state and a closed state, that the junction opening is designed for fluid-tight connection to an inflow opening of an adjacent filter cartridge.

11. The filter unit according to claim 1, wherein the outflow opening is assigned to a bottom side of the filter cartridge and an opening plane is defined by the outflow opening, and that the housing at the bottom side has at least one projection, configured as a circumferential edge, from the opening plane of the outflow opening for positioning the filter cartridge in a way to the projection corresponding filter receptacle of the oil-water-separating device.

12. A base unit of an oil-water-separating device for removal of oil-containing constituents from an oil-water mixture, wherein at least one inflow opening is provided on an inflow side for an introduction of purified liquid in an upstream filter unit, wherein a manifold is provided for a transfer of the purified liquid, wherein the inflow opening provides access for the purified liquid into the manifold wherein a riser is provided, wherein the riser is in fluid connection with the manifold and is equipped to outflow the purified liquid via an outflow opening provided downstream, wherein at least one filter receptacle is provided, wherein the filter receptacle is used for detachable connection and re-disassembly of the upstream filter unit in the form of a filter cartridge, according to claim 1, and wherein the inflow opening is arranged in the area of the filter receptacle and is made closable by an automatic collector closure, wherein the automatic collector closure disconnects the manifold from an environment and from a closed state for closing a fluid connection between the manifold and the environment into an open condition to enable the outflow of the liquid purified in the upstream filter unit.

13. The base unit according to claim 12, wherein at least two filter receptacles are provided for detachable connection and re-disassembly of at least two filter cartridges.

14. The base unit according to claim 12, wherein the automatic collector closure is arranged in such a way that an opening force directed onto an outer side of the automatic collector closure facing the environment, and, in the direction of the manifold, moves the automatic collector closure from the closed state to the open state, that the automatic collector closure is set up in such a way that a clamping force is directed onto an inner side of the automatic collector closure facing the manifold, and, in the direction of the environment, moves the automatic collector closure from the open state to the closed state.

15. The base unit according to claim 14, wherein a spring is adjacent to the inner side of the automatic collector closure, and the clamping force is at least partially applied to the inner side of the automatic collector closure, and/or that the purified liquid located in the manifold at least partially exerts the clamping force onto the inner side of the automatic collector closure.

16. The base unit according to claim 12, wherein, in the open state of the automatic collector closure, a flow channel is formed between an outer side of the automatic collector closure facing the environment and the base unit in the area of the inflow opening, which flow channel provides a fluid connection from an outside into the manifold.

17. The base unit according to claim 12, wherein the inflow opening is assigned to a top side of the base unit and an opening plane is defined by the inflow opening, and that the top side comprises at least one recess, being circumferential, wherein the recess is designed to be set back with relation to the opening plane of the inflow opening to hold a filter cartridge with at least one projection corresponding to the recess.

18. The base unit according to claim 12, wherein the automatic collector closure is designed to alternate between the open state for allowing the outflow of the liquid purified in the upstream filter unit and the closed state for closing a fluid connection between the manifold and the environment.

19. An oil-water-separating device for removing oil-containing components from an oil-water mixture characterized by a base unit according to claim 12, wherein at least one filter unit is provided in the form of the filter cartridge, wherein the filter cartridge corresponds in such a way to the filter receptacle, that when the filter cartridge is held in the filter receptacle, the automatic filter cartridge closure as well as the automatic collector closure collide in such a way that both the automatic filter cartridge closure and the automatic collector closure are each moved to the open state.

20. The oil-water-separating device according to claim 19, wherein a plurality of the filter cartridges is provided, wherein the plurality of the filter cartridges is connected in parallel and the filter cartridges with their outflow openings each flow into the manifold as a common manifold of the oil-water-separating device and this common manifold, in turn, flows into the riser as a common riser of the oil-water-separating device.

* * * * *